(12) United States Patent
Van Den Bossche et al.

(10) Patent No.: US 8,653,193 B2
(45) Date of Patent: Feb. 18, 2014

(54) POLYOLEFIN COMPOSITIONS AND PRODUCTS MADE THEREFROM

(75) Inventors: Linda M. Van Den Bossche, Zwijndrecht (BE); Nancy G. Vogelaers, Leefdaal (BE); Jean-Marc C. Dekoninck, Hamme-Mille (BE); Arnaud F. Alabrune, Sandweiler (LU); Michael E. Sieloff, Houston, TX (US); Bernard K. Beh, Singapore (SG)

(73) Assignee: ExxonMobil Chemical Patents Inc., Houston, TX (US)

( * ) Notice: Subject to any disclaimer, the term of this patent is extended or adjusted under 35 U.S.C. 154(b) by 116 days.

(21) Appl. No.: 13/377,589

(22) PCT Filed: Sep. 28, 2009

(86) PCT No.: PCT/US2009/058625
§ 371 (c)(1),
(2), (4) Date: Feb. 1, 2012

(87) PCT Pub. No.: WO2011/037590
PCT Pub. Date: Mar. 31, 2011

(65) Prior Publication Data
US 2012/0130006 A1    May 24, 2012

(51) Int. Cl.
| | |
|---|---|
| *C08F 8/00* | (2006.01) |
| *C08L 23/04* | (2006.01) |
| *B05D 1/36* | (2006.01) |
| *B05D 7/00* | (2006.01) |
| *B32B 15/08* | (2006.01) |
| *B32B 23/08* | (2006.01) |
| *B32B 27/08* | (2006.01) |

(52) U.S. Cl.
USPC ........... 525/191; 525/240; 427/408; 427/409; 427/411; 427/412; 427/412.1; 428/461; 428/511; 428/515

(58) Field of Classification Search
USPC .......... 525/191, 240; 427/408, 409, 411, 412, 427/412.1; 428/461, 511, 515
See application file for complete search history.

(56) References Cited

U.S. PATENT DOCUMENTS

| | | | |
|---|---|---|---|
| 5,674,342 A | 10/1997 | Obijeski et al. | |
| 7,235,607 B2 * | 6/2007 | Ohlsson | 525/191 |
| 7,588,706 B2 * | 9/2009 | Van Loon et al. | 264/173.14 |
| 8,247,065 B2 * | 8/2012 | Best et al. | 428/220 |
| 2013/0085231 A1 * | 4/2013 | Lue et al. | 525/240 |

FOREIGN PATENT DOCUMENTS

| | | |
|---|---|---|
| WO | WO 95/13321 | 5/1995 |
| WO | WO 98/21274 | 5/1998 |

* cited by examiner

*Primary Examiner* — Nathan M Nutter
(74) *Attorney, Agent, or Firm* — Leandro Arechederra, III

(57) ABSTRACT

A polymeric composition that is suitable for use as a film or a coating. The polymeric composition comprises: (a) a first component comprising copolymer derived from ethylene and one or more $C_3$ to $C_{20}$ α-olefin comonomers. The first component has a density of about 0.911 to about 0.918 $g/cm^3$, a compositional distribution breadth index (CDBI) of about 60% to about 85%, a melt index (MI) of about 16.0 to about 30.0 g/10 min, a molecular weight distribution (MWD) of about 1.5 to about 4.0, and a melt index ratio (MIR) of less than about 25; and (b) a second component comprising a low density polyethylene (LDPE). The second component has a g' of about 0.8 to about 0.15 and a MI that is lower than the MI of the first component.

20 Claims, 4 Drawing Sheets

POLYOLEFIN COMPOSITIONS AND PRODUCTS MADE THEREFROM

PRIORITY CLAIM

This application is a National Stage Application of International Application No. PCT/US2009/058625 filed Sep. 28, 2009, which is hereby incorporated by reference in its entirety.

FIELD OF THE INVENTION

The present invention relates to polyolefin compositions and products made therefrom. More particularly, the invention relates to polyolefin compositions comprising linear low density polyethylene (LLDPE) and low density polyethylene (LDPE) that are useful for producing extrusion coatings, films and laminates.

BACKGROUND OF THE INVENTION

Various polymer compositions have been used to form products such as extrusion coatings, films and laminates. For example, conventional low density polyethylene (LDPE) resins have been used in such products because they are easy to extrude and have high melt strength, which minimizes neck-in during processing. However, products formed of conventional LDPE lack toughness and have a relatively high seal initiation temperature and low hot tack.

Conventional linear low density polyethylene (LLDPE) resins have been used to form products having improved toughness and high hot tack, but their relatively narrow molecular weight distribution inhibits processability.

Conventional linear resins with very low density, such as very linear low density polyethylene (VLLDPE) and plastomers having a density of less than 0.915 g/cm³ offer high hot tack and very low seal initiation temperature, but tend to produce surfaces with higher blocking and coefficients of friction, which make them less easy to handle on packaging lines and/or during further conversion. The also exhibit high neck-in.

That said, what is needed in the art are compositions suitable for use in extrusion coatings, films and laminates that provide improved properties and processability (e.g., relatively broad hot tack plateau, high tensile strength, low seal initiation temperature, low surface blocking, as well as low neck-in and high draw down during processing).

SUMMARY OF THE INVENTION

In various embodiments, the invention relates to a composition comprising: (a) a first component comprising copolymer derived from ethylene and one or more $C_3$ to $C_{20}$ α-olefin comonomers; and (b) a second component comprising a low density polyethylene (LDPE). The first component has a density of about 0.911 to about 0.918 g/cm³, a compositional distribution breadth index (CDBI) of about 60% to about 85%, a melt index (MI) of about 16.0 to about 30.0 g/10 min, a molecular weight distribution (MWD, $M_w/M_n$) of about 1.5 to about 4.0, and a melt index ratio (MIR) of less than about 25. The LDPE has a MI that is lower than the MI of the first component and a branching index (g') of about 0.08 to about 0.15.

In various embodiments, the invention relates to articles comprising: (a) about 0.1 to about 99.9 wt % of linear low density polyethylene (LLDPE) and (b) about 0.1 to about 99.9% of low density polyethylene polymer (LDPE), where (a) and (b) based upon the weight of the composition. The LLDPE has a density in the range of about 0.911 to about 0.918 g/cm³, a compositional distribution breadth index (CDBI) of about 60% to about 80%, a Melt Index (MI) of about 16 to about 30 g/10 min, a molecular weight distribution (MWD) of about 1.5 to about 4.0, and a melt index ratio (MIR) of less than about 25. The LDPE has a MI that is lower than the MI of the first component and a branching index (g') of about 0.08 to about 0.15. In various embodiments, the LLDPE is metallocene-catalyzed. The LDPE may be formed through a high-pressure process.

The compositions described herein are suitable for use in films, coatings, and/or laminates, which may be used with a variety of substrates (e.g., paper, board, fabric, and aluminum foil). Moreover, the compositions may be used to form flexible pouches for use in pharmaceutical-industrial applications and food packaging.

DETAILED DESCRIPTION OF ILLUSTRATIVE EMBODIMENTS

Figure 1:
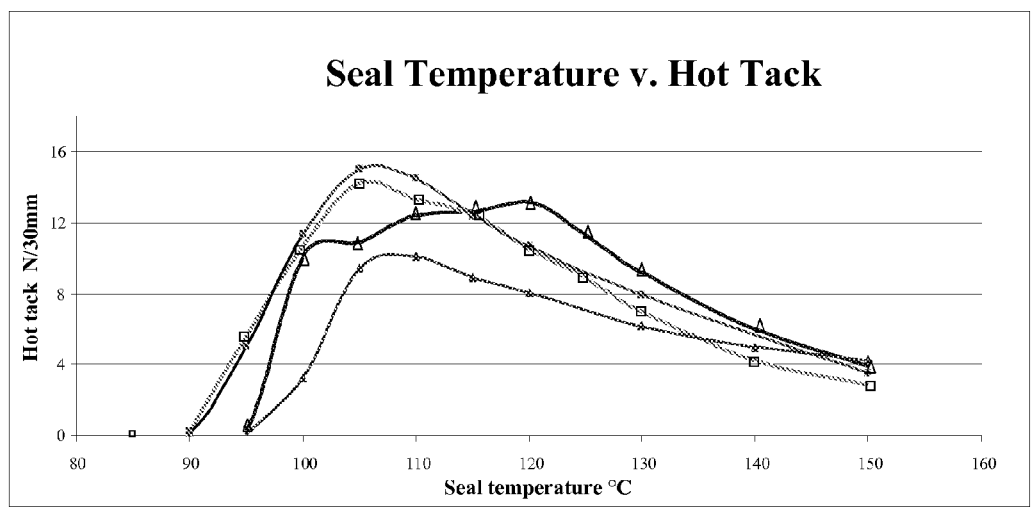
FIG. 1 illustrates the relationship of seal temperature vs. hot tack strength of various compositions.

Various specific embodiments, versions and examples of the invention will now be described, including preferred embodiments and definitions that are adopted herein for purposes of understanding the claimed invention. While the following detailed description gives specific embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

That said, described herein are improved polyolefin compositions and products made therefrom having one or more of the following properties: (a) a broad hot tack plateau; (b) a high tensile strength; (c) a low seal initiation temperature; (d) high draw down; and (e) and low neck-in, among other properties.

As discussed in more detail below, compositions described herein include at least a first component and a second component.

First Component

The first component comprises a linear low density polyethylene comprising a copolymer derived from ethylene and one or more $C_3$ to $C_{20}$ α-olefin comonomers. In various embodiments, the first component has one or more of the following properties:

(a) a density (ASTM D4703/D1505) of about 0.902 to about 0.945 g/cm³, or about 0.910 to about 0.930 g/cm³, or about 0.911 to about 0.918 g/cm³;

(b) a Compositional Distribution Breadth Index ("CDBI") of about 50% to about 90%, or about 60% to about 85%.

"CDBI" means the weight percent of the copolymer molecules having a comonomer content within 50% of the median total molar comonomer content. The CDBI of a copolymer may be determined using well known techniques for isolating individual fractions of a sample of the copolymer. One such technique is Temperature Rising Elution Fraction (TREF), as described in Wild, et al., *J. Poly. Sci., Poly. Phys. Ed.*, vol. 20, p. 441 (1982), which is incorporated herein by reference for this purpose;

(c) a Molecular Weight Distribution ("MWD", "$M_w/M_n$") of about 1.5 to about 4.0, or about 2.0 to about 3.5. Techniques for determining the molecular weight ("$M_w$" and "$M_n$") and molecular weight distribution ("MWD", "$M_w/M_n$") can be found in U.S. Pat. No. 4,540,753 to Cozewith et al. and references cited therein, and in VerStrate et al., *Macromolecules*, vol. 21, p. 3360 (1988) and references cited therein, which are incorporated herein by reference for this purpose;

(d) a Melt Index ("MI", ASTM D-1238, 2.16 kg, 190° C.) of about 5.0 to about 40.0 g/10 min, or about 10.0 to about 35.0 g/10 min, or about 16.0 to about 30.0 g/10 min; and (e) a Melt Index Ratio ("MIR", (190° C., 21.0 kg)/(190° C., 2.1 kg), ASTM D-1238) of about 20 to about 80, or about 25 to about 70, or about 30 to about 55.

The $C_3$ to $C_{20}$ α-olefin comonomer may be linear or branched, and two or more comonomers may be used, if desired. Examples of suitable α-olefin comonomers include propylene, butene, 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents; 1-octene; 1-octene with one or more methyl, ethyl, or propyl substituents; 1-nonene; 1-nonene with one or more methyl, ethyl, or propyl substituents; ethyl, methyl, or dimethyl-substituted 1-decene; 1-dodecene, and styrene.

In various embodiments, the first component is polymerized in the presence of a single-site catalyst. In a particular embodiment, the single-site catalyst is a metallocene. For example, the first component may comprise a metallocene-catalyzed linear low density polyethylene (m-LLDPE). Useful metallocene catalysts, resins and methods of manufacture are described in U.S. Pat. No. 6,932,592 entitled "Metallocene-Produced Very Low Density Polyethylenes" (Farley et al.), which is hereby incorporated by reference for this purpose.

The first components described herein are not limited by any particular method of preparation. In various embodiments, the ethylene-derived resin is produced by a continuous gas phase process and blended with a $C_3$ to $C_{20}$ comonomer.

In addition to those discussed above, first components that are useful in this invention include copolymers commercially available from ExxonMobil Chemical Company in Houston, Tex., such as those sold under the trade designation EXCEED™, including but not limited to those available under the grade names: 1012CA, 1012DA, 1015CA, EXXCOL™ 2, and EXCEED™ 4518PA, as well as EXXCO™ 012, EXACT™ 3040, and ENABLE™ 2010 series.

Second Component

The second component comprises low density polyethylene and has one or more of the following properties (determined according to the techniques described above, unless stated otherwise):

(a) a density of about 0.910 to about 0.940 g/cm³, or about 0.910 to about 0.930 g/cm³;

(b) a branching index ("g'") of less than about 0.20, or about 0.08 to about 0.15, or about 0.08 to about 0.11. Branching Index is an indication of the amount of branching of the polymer and is defined as $g'=Rg^2_{pm}/Rg^2_{ls}$, where $Rg_{pm}$ is the radius of gyration for the polymacromer, $Rg^2_{ls}$ is the radius of gyration for the linear standard, and $Rg_{ls}=K_sM^{0.58}$ where $K_s$ is the power law coefficient (0.023 for linear polyethylene), and M is the molecular weight as described above. $Rg_{pm}=K_TM^{\alpha_s}$. $\alpha_s$ is the size coefficient for the polymacromer, $K_T$ is the power law coefficient for the polymacromer, and M is the molecular weight as described above. See Macromolecules, 2001, 34, 6812-6820, for guidance on selecting a linear standard having the molecular weight and comonomer content, and determining K coefficients and α exponents. It is well known in the art that as the g' value decreases, long-chain branching increases;

(c) a Melt Index ("MI") of less than about 35 g/10 min, or less than about 25 g/10 min, or less than about 16 g/10 min. In a preferred embodiment, the second component has a lower melt index than the first component. For example, the second component may have an MI at least 5.0 g/10 min less than the MI of the first component;

(d) a Molecular Weight ("$M_w$" measured by Malls+Ri) of about 630,000 to about 1,400,000 g/mol;

(e) a Number Average Molecular Weight ("$M_n$" measured by viscometry+Ri) of about 16,500 to about 24,500 g/mol;

(f) a G' (storage modulus at G" of 500 Pa at 170 C) of about 100 to about 140 Pa; and (g) a Molecular Weight Distribution ("MWD" Mw (Malls)/Mn (universal)) of about 25 to about 70.

The second component may be a homopolymer or copolymer. In an embodiment, the second component comprises a polyethylene copolymer. For example, the second component may comprise LDPE and one or more of vinyl acetate, methyl acetate, butyl acetate, acrylic acid and ionomer and terpolymer.

In a preferred embodiment, the LDPE is branched or highly branched. LDPE compositions that are useful in this invention include those commercially available under the trade designation ExxonMobil™ LDPE by ExxonMobil Chemical Company in Houston, Tex., including but not limited to those available under the grade names: LD250, LD259, LD258, LD251, LD252, LD650 LD653, LD200.48, LD201.48 and LD202.48.

The second components described herein are not limited by any particular method of preparation and may be formed using any process known in the art. For example, the LDPE may be formed by high pressure autoclave or tubular reactor processes.

Additional Components

In addition to the first and second components, it will be understood that the compositions described herein may comprise one or more additional polymeric components (e.g., a component comprising polyethylene, polypropylene and the like).

Polymer blends are also contemplated. For example, the composition may comprise one or more additional LDPE resins, or one or more polyethylene resins with one or more additional resins other than LPDE, such as LLDPE, copolymer of vinyl acetate, methyl acetate, butyl acetate, acrylic acid and ionomer and terpolymer (such as those commercially available from ExxonMobil Chemical Company in Houston, Tex. under the trade designation Escorene™ Ultra EVA, Optema™ EMA, ExxonMobil™ EnBA, Escor™ EAA, Iotek™ Ionomer), metallocene-catalyzed LLDPE, and polypropylene (such as those commercially available from ExxonMobil Chemical Company in Houston, Tex. under the trade designation Vistamaxx™).

In various embodiments, one or more additives (i.e., additive package) may be included in the composition, in one or more components of the composition, and/or in a product formed from the composition, such as a film, coating or laminate. Such additives include for example, fillers, primary and secondary antioxidants (e.g., hindered phenolics such as IRGANOX™ 1010 or IRGANOX™ 1076 available from Ciba-Geigy), anti-cling additives, UV stabilizers, heat stabilizers, plasticizers, anti-blocking agents, release agents, anti-static agents, pigments, colorants, dyes, waxes, silica, fillers, talc, processing aids and the like.

In various embodiments, the amount of additives present in the composition is minimized "Minimized" means that the additives comprise less than 1.5 wt % based upon the weight of the composition.

Composition

The compositions described herein include at least 0.1 to 99.9 wt % of the first component and at least 0.1 to 99.9 wt % of the second component, based on the total weight of the composition. For example, the composition may include about 30 to about 90 wt % of first component and about 70 to about 10 wt % of second component.

In one preferred embodiment, the polymeric composition includes: (i) a metallocene-catalyzed LLDPE comprising ethylene and one or more $C_3$ to $C_{20}$ α-olefin comonomers having a density of about 0.911 to about 0.918 $g/cm^3$, a compositional breadth distribution index (CDBI) of about 60% to about 80%, a melt index (MI) of about 16 to about 30 g/10 min, a molecular weight distribution (MWD) of about 1.5 to about 4.0, and a melt index ratio (MIR) of less than about 25; and (ii) LDPE that has a branching index (g') of about 0.08 to about 0.13 and a MI that is lower than the MI of the LLDPE. For example, the MI of the LDPE may be at least 5 g/10 min lower than the MI of the LLDPE.

Composition Formation

The compositions described herein are not limited by any particular method of preparation, and may be formed using conventional or hereinafter devised equipment and methods, such as by dry compositioning the individual components and subsequently melt-mixing in a mixer, or by mixing the components directly together in a mixer (e.g., a Banbury mixer, a Haake mixer, a Brabender mixer, and/or dry mixer), or a single or twin-screw extruder, which may include a compounding extruder and/or a side-arm extruder used directly downstream of a polymerization process or on-line blending at the converter operation.

Processing Properties

In accordance with various embodiments, the compositions disclosed herein have one or more of the following processing properties:

(a) a neck-in at 100 m/min (constant output at 28 rpm, 280° C.) of about 50 to about 80 mm. In various embodiments, the composition has a neck-in of less than 18% of the operational die width mm when processed at a line speed of greater than 100 m/min; and (b) a draw down (DD) (constant output at 35 rpm, 280° C.) of about 250 to about 400 m/min. These properties were measured in coextrusion coatings whereby the above-described compositions are coextruded with 20% total coating weight of a copolymer used as a tie layer onto the paper substrate.

Products

The compositions may be used to form a variety of products (i.e., articles). For example, the compositions can be used to make films, coatings, and/or laminate in combination with a variety of substrates (e.g., paper, board, fabric, aluminum foil). Moreover, the compositions may be used to form flexible pouches for use in pharmaceutical-industrial applications and food packaging, such as milk pouches. Such products may be produced by any method known or hereinafter devised, e.g., extrusion, coextrusion, and lamination processes. In an embodiment, the products made by the compositions described herein are substantially waterproof.

Product Properties

In accordance with various embodiments, the products formed using the compositions disclosed herein have one or more of the following properties (as determined by the procedures described herein):

(a) a hot tack plateau between about 8 to about 15 N/30 mm, or about 10 to about 14 N/30 mm, at seal temperature of about 100 to about 125° C.; and (b) a seal initiation temperature (N/30 mm) of less than about 100° C., or less than about 95° C., or about 90 to about 95° C.

In various embodiments, the products exhibit excellent adhesion between layers and/or good moisture blocking.

EXAMPLES

The advantages of the compositions described herein will now be further illustrated with reference to the following non-limiting examples.

Materials and Methods

The properties cited below were determined in accordance with the following test procedures. Where any of these properties is referenced in the appended claims, it is to be measured in accordance with the specified test procedure.

Hot Tack was determined using a J&B Model 4000 hot tack tester;

Neck-In was determined using a monoextrusion coating at 295° C. set temperature, 35 rpm screw output, 500 mm die width, 18 mm air gap; and Seal Strength was determined by conditioning a 15 mm-wide sample for a minimum of 24 hours at 23° C.±3° C. and 50% humidity±5% humidity. The seal strength was measured in a Zwick tensile instrument at a speed of 100 mm/min, a load cell-of 200N or any other load cell with appropriate sensitivity, and a clamp distance of −50 mm. The sample was placed between the clamps and the clamps were moved apart at a speed of 100 mm/min. Four test samples were measured and the maximum force was recorded and an average is made. The seal strength is the force at which the sample failed. The seals were prepared using the J&B hot tack tester with the following sealing conditions: sealing time: 0.5 s, sealing pressure: 0.5 $N/mm^2$, cooling time: 0.04 sec, sealing width of samples: 30 mm. After 24 hours, the samples are cut to 15 mm.

Table 1 lists the components used in Examples 1 and 2.

TABLE 1

Resins Used in the Examples

| Component | Brief Description | Commercial Source |
|---|---|---|
| 1 | 70% mLLDPE Resin (19MI) + 30% EXXONMOBIL ™ LDPE (12 MI) | ExxonMobil Chemical Company |
| 2 | 70% EXACT ™ Resin (19MI) + 30% EXXONMOBIL ™ LDPE LD (5MI), melt blend | ExxonMobil Chemical Company |
| 3 | EXXONMOBIL ™ LDPE LD (8 MI) | ExxonMobil Chemical Company |
| 4 | 70% EXACT ™ Resin (19MI) + 30% EXXONMOBIL ™ LDPE LD (5MI), dry blend | ExxonMobil Chemical Company |
| 5 | Comparative example, metallocene LLDPE blended with LDPE (MI > 25) | N/A |

TABLE 1-continued

Resins Used in the Examples

| Component | Brief Description | Commercial Source |
|---|---|---|
| 6 | 70% metallocene LLDPE (12MI) with 30% LDPE (5MI) | ExxonMobil Chemical Company |

Example 1

FIG. 1 illustrates the relationship of hot tack and seal temperature of substrates coated with an inventive resin or various comparative resins. The coated structures are 70 g/m² kraft paper coated with 5 g/m² ESCOR™ ethylene acrylic acid (EAA) as a tie layer and a 20 g/m² resin coating selected from the list of components provided in Table 1. The samples were produced on an ExxonMobil pilot coating line.

Example 2

Figure 2:
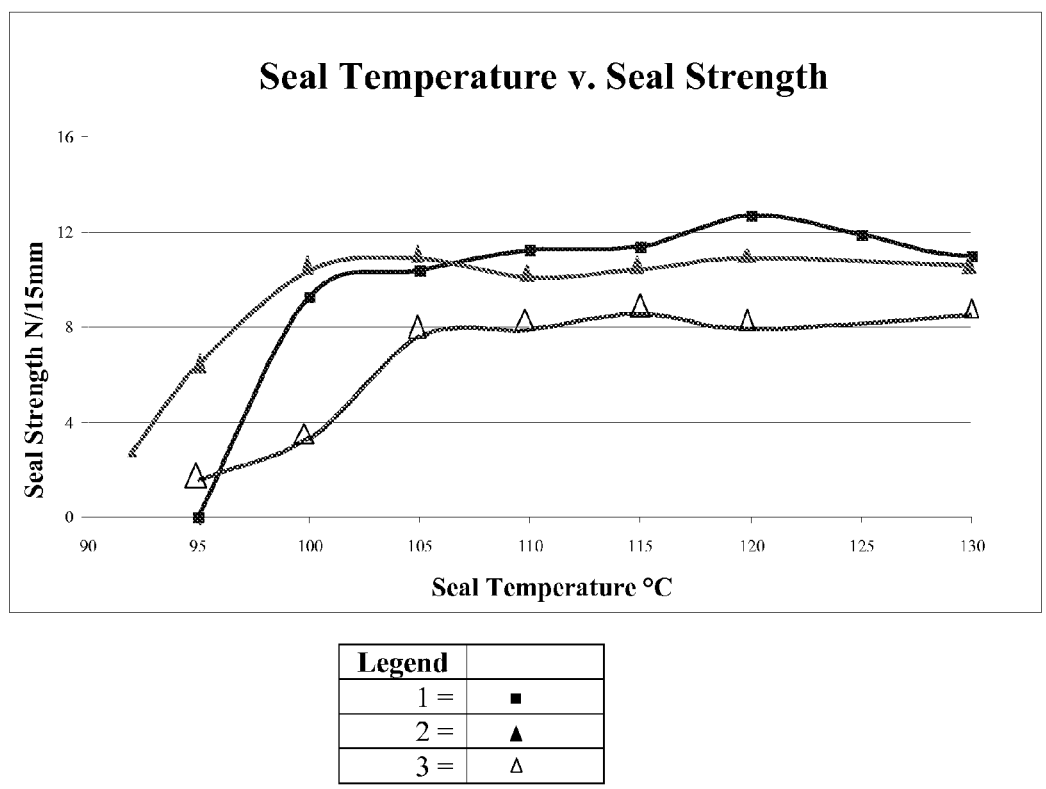
FIG. 2 illustrates the relationship of seal temperature vs. seal strength of various compositions.

FIG. 2 illustrates the relationship of seal strength and seal temperature of substrates coated in an inventive resin or various comparative resins. The coated structures are 70 g/m² kraft paper coated with 5 g/m² ESCOR™ ethylene acrylic acid (EAA) tie layer and a 20 g/m² resin coating selected from the list of components provided in Table 1. The samples were produced on an ExxonMobil pilot coating line.

Example 3

Figure 3:
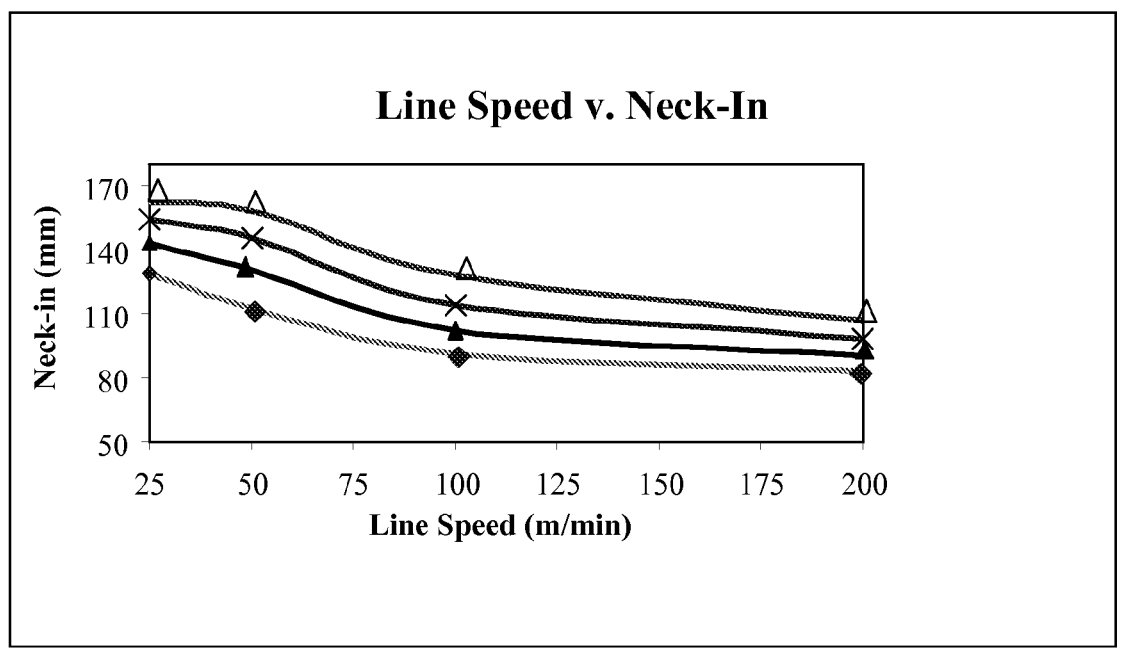
FIG. 3 illustrates the relationship of neck-in vs. line speed varying the amounts of primary and secondary antioxidants.

FIG. 3 illustrates the relationship of neck-in and line speed of a monoextrusion coating comprising varying levels of additives (i.e., primary and secondary oxidants). The neck-in was measured at 295° C. set temperature, 35 rpm screw output, 500 mm die width, and 18 mm air gap. As shown, neck-in was reduced as the additive content was minimized. The samples were produced on an ExxonMobil pilot coating line.

Example 4

Figure 4:
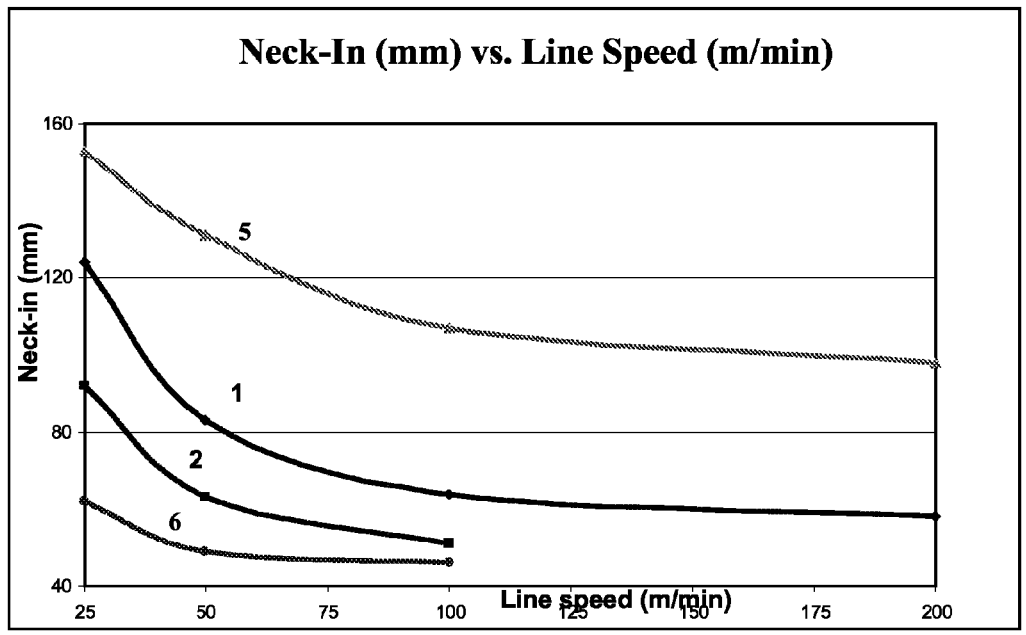
FIG. 4 illustrates the neck-in vs. line speed of various compositions.

FIG. 4 illustrates the neck-in (mm) of various coextruded blends. Extruder A (operated at 28 rpm) contains a metallocene polymer blend and extruder B (operated at 19 rpm) contains a tie layer of 70 gsm kraft paper coextruded with a tie layer (20% total weight/sealing layer, 80% coating weight). The neck-in was measured at 280° C. set temp. The samples were produced on an ExxonMobil pilot coating line.

Example 5

Figure 5:
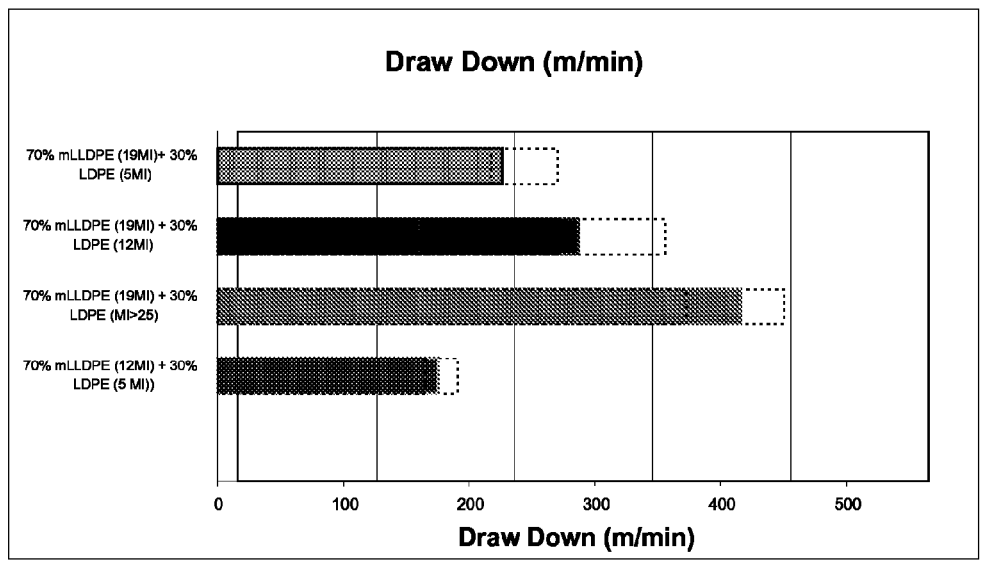
FIG. 5 illustrates the draw down (DD) of various compositions.

FIG. 5 illustrates the draw down (m/min) of various coextruded blends. Extruder A (28 rpm) contains a metallocene polymer blend and Extruder B (19 rpm) contains a tie layer of 70 gsm kraft paper coextruded with a tie layer (20% total coating weight/sealing layer, 80% coating weight). The draw down was measured at 280° C. set temp. The samples were produced on an ExxonMobil pilot coating line.

The embodiments and tables set forth herein are presented to best explain the present invention and its practical application and to thereby enable those skilled in the art to make and use the invention. However, those skilled in the art will recognize that the foregoing descriptions and tables have been presented for the purpose of illustration and example only. The description set forth is not intended to be exhaustive or to limit the invention to the precise form disclosed. Many modifications and variations are possible in light of the above teaching without departing from the spirit and scope of the claims.

We claim:

1. A composition comprising:
    (a) a first component comprising copolymer derived from ethylene and one or more $C_3$ to $C_{20}$ α-olefin comonomers, the first component having:
        a density of about 0.911 to about 0.918 g/cm³;
        a compositional distribution breadth index of about 60% to about 85%;
        a melt index of about 16.0 to about 30.0 g/10 min;
        a molecular weight distribution of about 1.5 to about 4.0; and
        a melt index ratio of less than about 25; and
    (b) a second component comprising a low density polyethylene having:
        a g' of about 0.08 to about 0.15; and
        a melt index that is lower than the melt index of the first component.

2. The composition of claim 1, wherein the melt index of the second component is at least 5 g/10 min lower than the melt index of the first component.

3. The composition of claim 1, wherein the first component is a linear low density polyethylene.

4. The composition of claim 3, wherein the linear low density polyethylene is metallocene-catalyzed.

5. The composition of claim 1, wherein the α-olefin is selected from a group consisting of pentene, hexene, heptene, octene, or mixtures thereof.

6. The composition of claim 1, wherein the low density polyethylene is formed under high pressure.

7. The composition of claim 1, wherein the first component is present in an amount of about 0.1 to 99.9 wt %, and the second component is present in an amount of about 0.1 to 99.9 wt %, both based on the total weight of the composition.

8. The composition of claim 7, wherein the first component is present in an amount about 30 to 90 wt %, and the second component is present in an amount of about 70 to 10 wt %, both based on the total weight of the composition.

9. The composition of claim 1, wherein the composition comprises less than about 1.5 wt % of additives, based upon the total weight of the composition.

10. The composition of claim 1, wherein composition has a neck-in of less than 18% of the operational die width mm when processed at a line speed of greater than 100 m/min.

11. An article comprising a composition of:
    (a) about 0.1 to about 99.9 wt % of linear low density polyethylene, wherein the linear low density polyethylene is a copolymer derived from ethylene and one or more $C_3$ to $C_{20}$ α-olefin comonomers and has:
        a density of about 0.911 to about 0.918 g/cm³;
        a compositional distribution breadth index (CDBI) of about 60% to about 85%;
        a melt index of about 16.0 to about 30.0 g/10 min;
        a molecular weight distribution of about 1.5 to about 4.0; and
        a melt index ratio of less than about 25; and
    (b) about 0.1 to about 99.9% of a low density polyethylene, the low density polyethylene having:
        a g' of about 0.08 to about 0.15; and
        a melt index that is less than the melt index of the linear low density polyethylene, wherein the wt % of (a) and (b) are based upon total weight of the composition.

12. The article of claim 11, wherein the sum of (a) and (b) is 100%.

13. The article of claim 11, wherein the low density polyethylene is formed through a high pressure process.

14. The article of claim 11, wherein the article is an extrusion coating.

15. The article of claim 11, wherein the article is selected from a group consisting of a film, a laminate, a coating structure, a pouch, and a membrane.

16. The article of claim 15, wherein the article has a seal initiation temperature of about 90 to about 95° C.

17. The article of claim 15, wherein the article comprises a hot tack plateau between about 10.0 to about 14.0 N/30 mm for a seal temperature range of about 100 to about 125° C.

18. The article of claim 11, wherein the article is substantially waterproof.

19. The article of claim 11, wherein the article is used to coat a substrate.

20. The article of claim 19, wherein the substrate is selected from a group consisting of paper, wood, fabric, film, and aluminum foil.

\* \* \* \* \*